April 26, 1927.
N. FRYMAN
FRUIT PICKER
Filed April 24, 1926
1,626,402
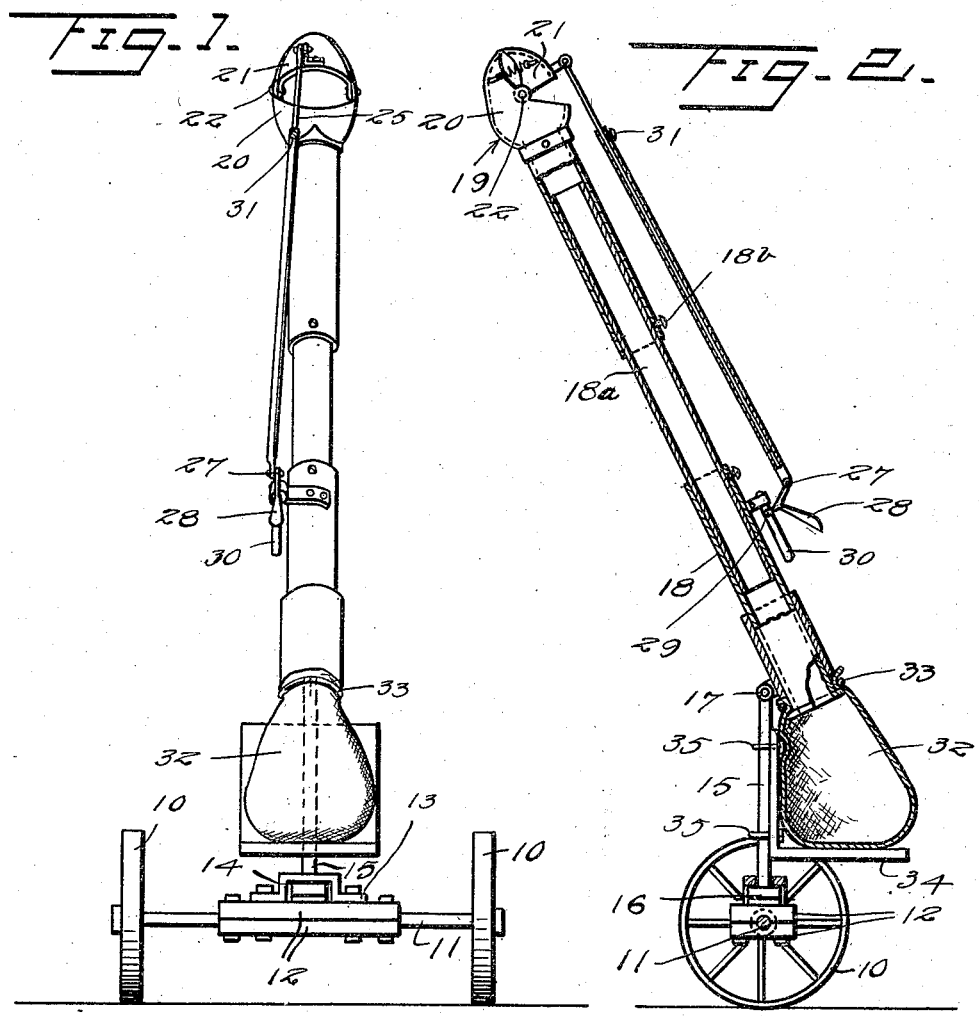
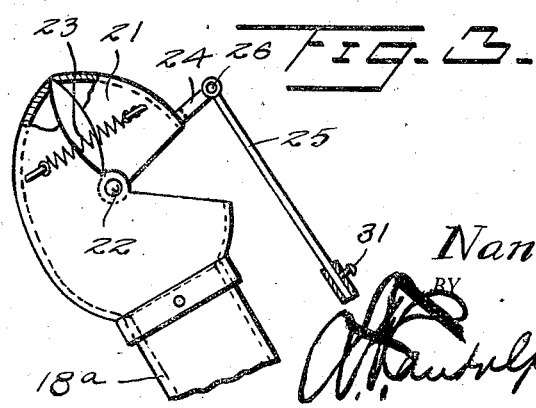
INVENTOR.
Nancy Fryman
BY
ATTORNEY.

Patented Apr. 26, 1927.

1,626,402

UNITED STATES PATENT OFFICE.

NANCY FRYMAN, OF INDIANAPOLIS, INDIANA.

FRUIT PICKER.

Application filed April 24, 1926. Serial No. 104,425.

This invention relates to a fruit picker.

It is aimed to provide a structure adapted for travel on the ground which is capable of substantially universal adjustment and readily operable to pick the fruit, and a construction wherein the sack for the picked fruit is efficiently supported.

Additional objects will be pointed out and otherwise become apparent from a consideration of the description following taken in connection with accompanying drawings illustrating an operative embodiment.

In said drawings:—

Figure 1 is a view of the picker in elevation;

Figure 2 is a side view partly in section, and

Figure 3 is an enlarged elevation of the picker head.

Referring specifically to the drawings, the device is supported by two ground wheels 10 journaled on an axle 11 clamped between two plates 12 forming a body, as by means of bolts 13. An arched bracket 14 is detachably secured to the top of the body by two of the bolts 13 and a post 15 passes upwardly through an opening in the bracket, the head 16 of the post being accommodated in the arch of the bracket. Said post is turnable or swiveled with respect to the bracket 14 and the body and at its upper end as at 17, is pivotally connected to a tube or chute 18. Said tube or chute 18 is made in a plurality of relatively slidable sections 18$^a$, adjustably secured together by binding screws 18$^b$ carried by certain of the sections.

The uppermost section 18$^a$ has a picker head 19 thereon comprising a stationary jaw section 20 and a movable jaw section 21, pivoted to the former as at 22. A contractile coil spring 23 is fastened at its ends to said jaw sections. A crank 24 extends from the movable jaw section 21 and has a rod 25 pivoted thereto at 26. Said rod in turn is pivoted at 27 to a bell crank lever 28 pivoted at 29 to a handle 30, rigid on and offset from one of the sections 18$^a$. In order that the rod 25 may be adjusted to compensate for the adjustment in length of the tube, said rod 25 is preferably made in telescopic sections as shown, which are capable of fastening in any adjusted position through the manipulation of a binding element 31.

At the lower end of the tube, a bag or other receptacle 32 is provided to catch the fruit which is picked and enters the same through the tube. Said receptacle 32 is detachably connected as by a spring wire 33, to the lower end of the tube, and the receptacle rests on a shelf 34 fastened to the post 15 as at 35.

In use, the device is moved over the ground, with the occupant for instance engaging the element 30 with one hand in order to maintain it elevated and to push it. The head 19 is placed in proper position relative to the fruit to be picked and the lever 18 is rocked while the hand simultaneously engages the handle 30 and lever 28, in order to open the jaw 21 relatively to jaw 20. The fruit is engaged between the jaws 20 and 21, after which the lever 28 is released and the spring 23 draws the jaw 21 to closed position, thus snapping the stem of the fruit, and picking the latter, which falls through the tube 18 into the sack 32. It will be realized of course that the device may be adjusted as to length as desired and that in addition to being propelled over the field on the wheels 10, the picker parts may be revolved about a vertical axis due to the swivel mounting of the post 15.

Various changes may be resorted to provided they fall within the spirit and scope of the invention.

I claim as my invention:—

1. A device of the class described comprising a tube, picker means carried thereby, a wheeled body, a post rotatably supported on said body and on which said tube is mounted, and means on said post to support a receptacle to catch fruit falling through the tube.

2. A device of the class described comprising a tube, picker means thereon comprising a fixed jaw, a movable jaw pivoted to the fixed jaw, means to urge the movable jaw to closed position, means operable to open the movable jaw, a post on which said tube is pivoted, and a mobile body on which said post is swiveled.

3. A device of the class described comprising a tube, picker means thereon comprising a fixed jaw, a movable jaw pivoted to the fixed jaw, means to urge the movable jaw to closed position, means operable to open the movable jaw, a post on which said tube is pivoted, a mobile body on which said post is swiveled, a receptacle to which said tube leads, and a shelf secured to said post supporting said receptacle.

In testimony whereof I affix my signature.

NANCY FRYMAN.